June 26, 1951  C. S. LINDER  2,557,983
TRANSPARENT ELECTRONDUCTIVE ARTICLE
Filed March 22, 1949  2 Sheets-Sheet 1

Inventor
CYRIL S. LINDER
By Olen E. Bee
Attorney

June 26, 1951  C. S. LINDER  2,557,983
TRANSPARENT ELECTRONDUCTIVE ARTICLE
Filed March 22, 1949  2 Sheets-Sheet 2
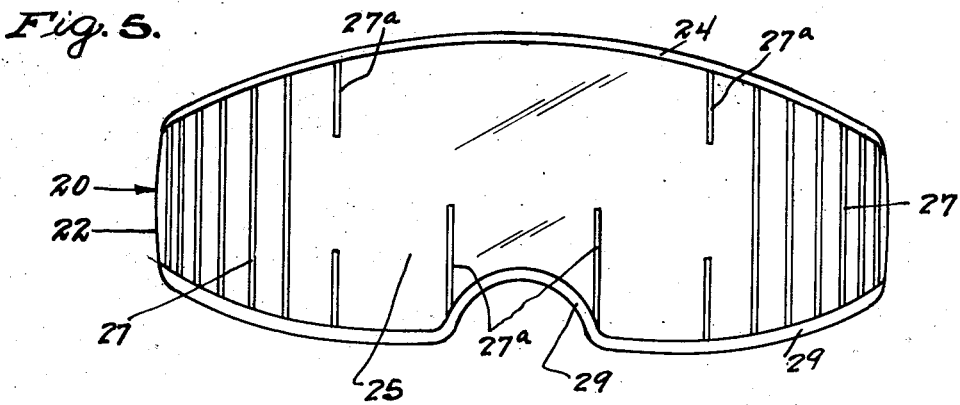
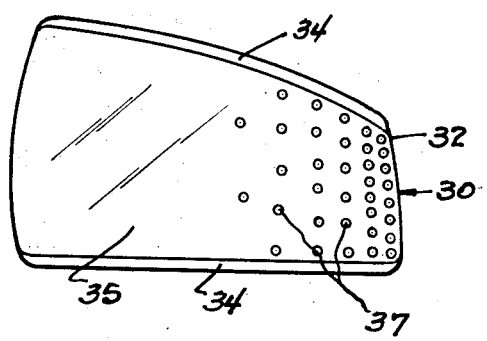
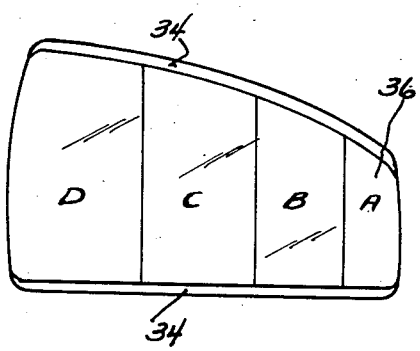
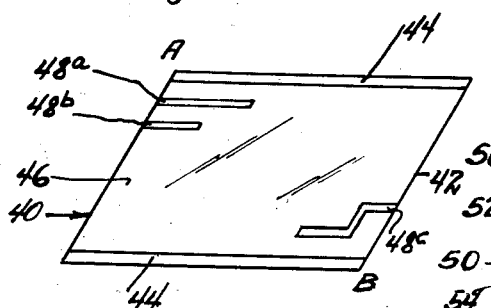
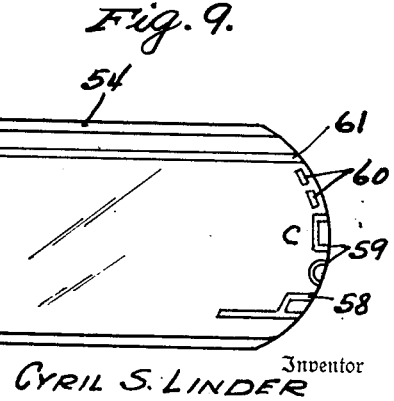
Inventor
CYRIL S. LINDER
By Olen E. Bee
Attorney Patented June 26, 1951

2,557,983

UNITED STATES PATENT OFFICE 2,557,983

TRANSPARENT ELECTROCONDUCTIVE ARTICLE

Cyril S. Linder, Tarentum, Pa., assignor to Pittsburgh Plate Glass Company, Allegheny County, Pa., a corporation of Pennsylvania Application March 22, 1949, Serial No. 82,728

13 Claims. (Cl. 219—19)

This invention relates to improved ceramic or refractory bodies, particularly to transparent ceramic or refractory articles such as windshields or other similar structures, having electroconductive transparent coatings deposited thereon. The invention further relates to an improved method for depositing electroconductive transparent coatings upon ceramic or refractory viewing closures. More particularly, it relates to articles of this character having laterally spaced electroconductive strips or bus bars in electrical contact with the film and adapted to facilitate passage of electric current through the coating.

It is known that transparent electroconductive films may be deposited upon glass by applying stannic chloride to the surface of glass heated above 400° F., preferably 850 to 1350° F. Films of superior conductivity may be produced according to methods described in application for United States Letters Patent, Serial No. 762,658 filed July 2, 1947, by William O. Lytle. These films or coatings are obtained by spraying plate, window or other glass while it is heated to a temperature of above 400° F., but below the temperature at which the glass becomes molten, with tin tetrachloride or other tin salts in aqueous solution or in vapor state, in the presence of a reducing agent such as methanol, phenyl hydrazine hydrochloride, or other agents. The films thus obtained are of unknown composition, but appear to contain a preponderant amount, of the order of 97 to 99%, of a tin oxide and certain impurities which may include metallic tin, carbon, silicon, sodium and chlorine and other impurities, depending upon the composition of the applied tin containing solution. These films have a thickness of about 50 to 800 millimicrons, are transparent and have the unusual characteristics of being electroconductive, the particular degree of electroconductivity being dependent, to a large degree, upon the nature of the process of depositing the films. Tin oxide films, which are deposited in accordance with the processes described and claimed in the aforesaid application of William O. Lytle, incorporation of the disclosure of which is made a part hereof by reference, have a resistance below about 500 ohms per unit square, a specific resistance below about 0.002 ohm centimeters, and a haze factor below about 2.5%. Further details respecting the production of these films will be supplied hereinafter. Although articles having such films are useful in many fields, they have been found to be especially useful as windshields or viewing closures in automobiles, aircraft, trains and similar automotive vehicles. In such use the coating is placed in series with a source of electric potential and is used as a heating element in order to heat the closure and prevent deposition of ice, fog, etc. thereupon.

As disclosed in the Lytle application, a glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment and, therefore, preferably should be of a ceramic character. Furthermore, they should be capable of fusing or otherwise forming an adherent, well-bonded coating to the glass. The strips should adhere firmly to the glass sheet, and should have a conductivity at least 10 to 20 times that of the conductive coating. Generally, the strips are from about 0.05 to 1 inch in width.

In practice, it has been found that the most satisfactory compositions, for use in preparing the bus bars, comprise a highly conductive metal powder, (preferably gold or silver) and a vitrifying binder. Typical ceramic conductive coating materials which may be used have the following composition:

| | Percent by weight |
|---|---|
| 1. PbO | 7.5 |
| $B_2O_3$ | 1.0 |
| $SiO_2$ | 1.5 |
| Flake silver | 70.0 |
| French fat oil | 12.5 |
| Turpentine | 7.5 |
| 2. Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop, in use, excessive stresses in the glass, the bus bar preferably should be located on the extreme edge of the glass and the bus bar thickness should not exceed about 0.005 inch and, preferably, should be below about 0.003 inch.

After application of the ceramic metal bus bars to the glass sheet by painting or other method, the sheet is heated to the temperature at which application of the conductive coating may be effected, for example, above about 400 to 800° F. but below the fusion point of the glass, usually 950 to 1150° F. During this heating operation, the ceramic metal coating is fused onto the glass so that a firm bond is established between the glass and the metal coating.

When the glass has been heated as above described, for one or two minutes, it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period, usually of the order of 2 to 20 seconds, depending upon the thickness of film to be produced, the air pressure imposed upon the atomizing spray gun, etc. Usually this spraying operation is conducted in air of atmospheric humidity or oxygen. However, conductive coatings have been obtained even when oxygen appears to be essentially absent, although it is probable that oxygen, either from the atmosphere or combined in water or similar compound, is essential to the operation. This process results in the production of a base coated with a tin oxide electro-conductive film.

Articles produced according to the above description, further details of which will be supplied below, are suitable for use as viewing closures or windows. Usually they are laminated with a suitable plastic such as polyvinyl butyral to reinforce the glass and provide a so-called "safety glass" construction. These closures may be successfully heated by imposing an electric potential across the bus bars, thus using the conductive film as a resistance element.

In the past, an unduly high number of windshields or like panels of the type herein described have failed in use or test. This failure frequently is manifested by fracture of the glass after an electric potential has been imposed across the bus bars to cause the film to be heated to a suitable temperature or above (for example 100 to 125° F.) for a period of time. Such failure has been discovered to be particularly apt to occur in certain panels having a contour such that the bus bars must be disposed in a non-parallel relationship. A typical illustration is the circular type of closure which is frequently found in marine or aeronautical craft. If two parallel equidistant bus bars were employed in such a unit, it would be impossible to place them in proper position to obtain the benefit of the electro-conductive coating over the entire area of the closure. Consequently in this and many other installations, non-parallel bus bars must be employed to secure full coverage of the glass base by an electroconductive film. Such panels show a serious tendency to fracture or fail in test or in use.

In accordance with this invention, it has been found that one of the causes of such failure is unequal distribution of current flow along one or both of the bus bars. This is especially true in the case of uniform resistivity bases, upon which unequal distribution of current flow will result in unequal heating. It has been found that substantial reduction in failures may be effected by providing means between the bus bars for effectively reducing such unequal distribution.

It will be understood that when a panel is provided with non-parallel bus bars, the current flow will tend to be highest at the point or points where the bus bars are closest together, and lowest at the point or points where the bus bars are farthest apart. In like manner, when one bus bar of a pair of bus bars (whether or not parallel) is longer than the other, the density of current flow and consequent heat generation tends to be highest at the ends of the shorter bus bar. Consequently a large current may flow to a bus bar at one point or area along its length and a relatively lower current may flow to the bus bar at another point or area along its length.

According to this invention, means are provided to direct and control current flow between bus bars on an electroconductive panel such as described above, and particularly means are provided whereby to reduce the magnitude of variation of current flow along one or both of the bus bars.

Several means of accomplishing this result are available. For example, at areas where the distance between opposite points on the bus bars becomes smaller or where for other reasons high current flow tends to occur, the length of the path of the current passing through the electroconductive film may be increased to reduce the flow of current to such area. This can be accomplished by placing areas or barriers of non-conductivity or relatively low conductivity intermediate the bus bars around which the current must flow, thereby increasing the length of the path of current flow. These areas of lower conductivity may have various geometrical shapes such as will hereinafter be described. To serve effectively as barriers, they should be nonconductive or may even have surface resistivities which are substantially greater, usually at least twice and preferably five or more times the average surface resistivity of the transparent film.

According to one embodiment, such barriers may be disposed to direct or channel the flow of current to certain desired sections of a bus bar.

According to a further embodiment, the surface resistivity distribution of the electroconductive film may be varied to compensate for variations in the overall resistance between the bus bars. This may be accomplished by provision of means to increase the film resistance between opposited points on the bus bars at areas where current flow is unduly high or, conversely, to decrease the resistance between opposed points on the bus bars in areas where current flow is unduly low.

The foregoing embodiments of the invention have been described with reference to some of the specific problems involved. It is to be understood, however, that recourse to numerous other embodiments of the invention may be had in order to provide means for modification of current distribution for any purpose desired.

Accomplishment of the foregoing constitutes some of the principal objects of the present invention and the manner by which these and other objects of the invention are attained will be more fully understood by reference to the ensuing description taken in conjunction with the accompanying drawings in which:

Fig. 5 is a diagrammatic plan view of an essentially rectangular glass panel suitable for use as a windshield, illustrating another embodiment of the invention;

Figs. 6 and 7 are diagrammatic plan views of essentially quadrilateral glass panels which are suitable as closures in aircraft, automobiles, locomotives or other vehicles, illustrating a further embodiment of the invention, and Figs. 8 and 9 are diagrammatic plan views of glass panels suitable as closures illustrating further embodiments of the invention.

Figure 1:
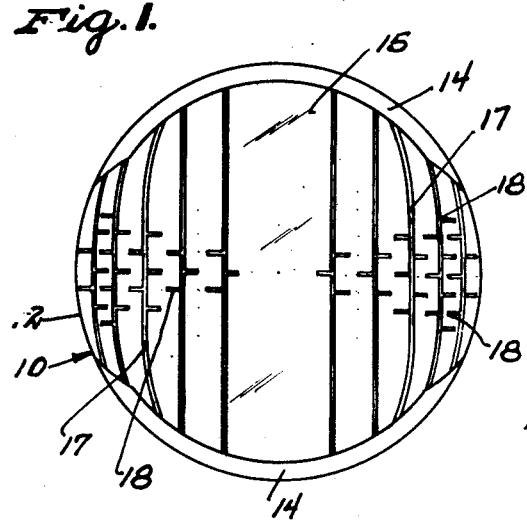
Figs. 1, 2 and 4 are diagrammatic plan views of circular glass panels embodying the present invention suitable for use as a port-hole in the cabins of aircraft or in marine vessels or other purpose and having an electroconductive coating thereon.
Figure 2:
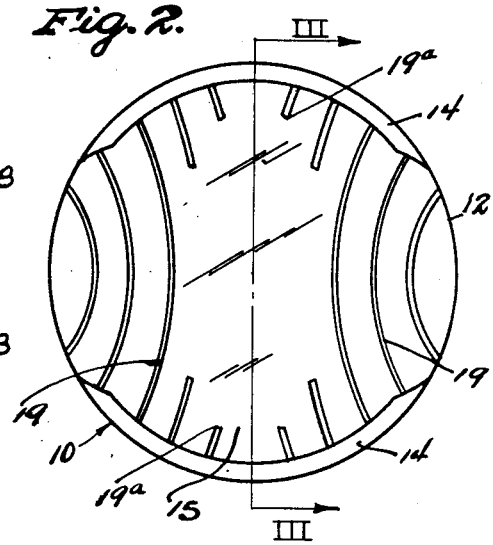
Figure 3:
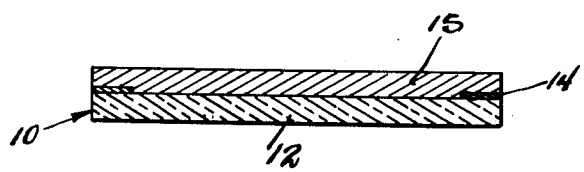
Fig. 3 is a diagrammatic sectional view taken along line III—III of Fig. 2 and is represenative of cross sectional views of Figs. 1, 4, 5, 6, 7, 8 and 9 also.
Figure 4:
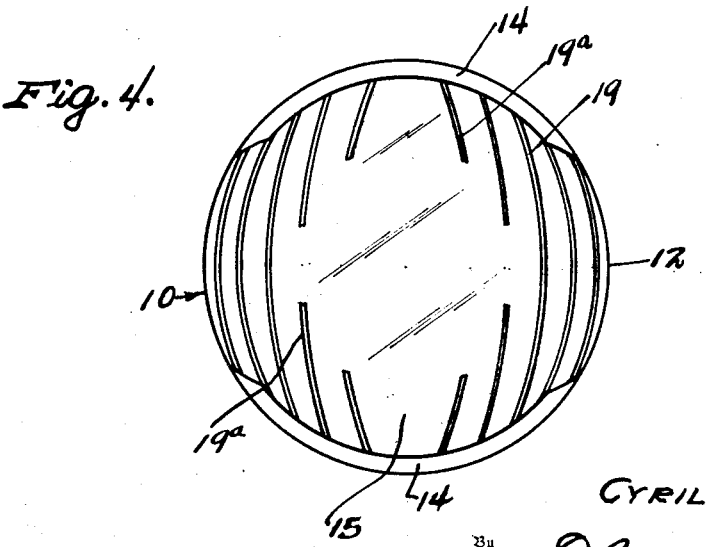

In the drawings, Figs. 1, 2 and 4 diagrammatically illustrate three embodiments of the invention. The heating panel 10 comprises a glass sheet 12 circular in form having bus bars or conductive edge strips 14 of ceramic silver, gold, or other electroconductive metal composition along opposite sides and close to the edges (preferably within 0.5 inch of the edge or on the marginal edge) of the sheet. The bus bars 14 may be connected to opposite poles of a source of potential (not shown).

The glass sheet 12 is provided with an electroconductive transparent metal oxide film 15 such as is formed by spraying or otherwise applying a tin compound or similar compound on the heated panel as previously described. The resistance of such film per unit square (surface film resistance) normally is substantially constant. That is, while there may be some variation in the thickness and conductivity of these films, the variation is random and generally speaking (neglecting small areas) unless special precautions are taken, the average surface resistance (in ohms per unit square) of the areas of the film between one pair of opposed bus bar sections will not materially differ (rarely more than plus or minus 50 percent from the average for the entire film) from that between another pair of opposed bus bar sections.

In Figs. 1, 2 and 4 areas of nonconductivity or relatively low conductivity are shown. It will be noted that in Fig. 1, the substantially vertically disposed areas or channels 17 are approximately equidistant from each other while in Figs. 2 and 4 the distance between individual channels 19 and 19a decreases as the distance between the bus bars decreases. Other spacing arrangements may be utilized, however. The spacing will depend to some extent on the shape of the plate, and also on the reduction in temperature or the current distribution required. In the panel illustrated in Fig. 1 the areas of lower conductivity are not restricted to vertical channels but include short spurs or baffles 18 which intersect the vertical channels 17 at a suitable angle, for example approximately 90°. The frequency of occurrence of these baffles may increase if desired with the proximity of the bus bars so that the shorter the distance between the bars the greater the number of the nonconductive or less conductive members. Although as illustrated the short spurs are placed at equal intervals on the vertical channels, it is to be understood that this is a typical illustration only and that it is within the contemplation of the invention that other variations in this type of arrangement of the less conductive areas can be effectively made.

The provision of channels 17 serves to increase the length of the path of current flow between opposed sections of the bus bars and thus to increase the resistance between the bus bar sections. This increase serves to compensate for the actual variation in distance between the bus bars so that the effective length of the current paths are substantially equal or at least do not vary excessively.

The embodiments in Figs. 2 and 4 illustrate methods in which arcuate channels 19 and 19a may be employed to direct current flow. The channels in Fig. 2 are convex inwardly while the channels in Fig. 4 are concave inwardly. It is not necessary that the channels extend completely from one bus bar to the other as is shown since channels 19a which extend only partially across the intermediate area may be provided. The channels or barriers 19 and 19a tend to direct current flowing between the bus bars at points spaced from the central area or adjacent the sides of the panel to flow in an arcuate or substantially arcuate path, thereby increasing the length of the paths of current flow and compensating at least partially for the decreased distance between the bus bars at such points. If uniform distribution of current flow is desired in such panels, the channels preferably are progressively closer to each other as the distance between the bus bars decreases, however, other spacings may be used to achieve a different current distribution. It will be noted that in Fig. 2, the channels adjacent the edge of the panel essentially isolate the edge sections of the panel from the bus bars thus precluding substantial current flow through these edge sections, whereas in Fig. 4 the edge sections of the panel are not isolated from the bus bars. Therefore in the embodiment of Fig. 4, it is possible to heat the extreme edges of the panel while maintaining a substantially even distribution of current throughout the entire panel.

The areas of lower conduction are generally nothing more than exposed areas of the base itself which is a non-conductor of electricity, or areas in which a portion of the electroconductive film has been removed, although they may be formed by applying a non-conductive material in lieu of the film if desired. Commercial practice favors the use of the exposed glass surface since the desired areas may be readily prepared either by masking them out in prearranged pattern before applying the electroconductive film or by first applying the film and then removing part or all of it from those portions of the panel which are to serve as the less conductive areas.

In giving consideration to the application of a masking compound prior to applying the electroconductive film to the panel, it must be remembered that the coating process is carried out at temperatures in excess of 800° F. to achieve an optimum result. Consequently the various masking tapes cannot be used since they would be destroyed at temperatures well below those encountered in practice.

It has been found that a pulverulent mixture of certain materials such as silica, alumina, alkalies and a boron compound when applied as a paste or magma to a glass surface will form a very effective mask during the application of the coating solutions commonly employed in producing transparent electroconductive films. The mask is impermeable to the film-forming ingredients, is heat resistant, inert with respect to glass at elevated temperatures, and is readily removed from the glass at the conclusion of the application of the electroconductive film.

A typical composition suitable for use in coating the base where non-conductive areas are desired contains solids tabulated as follows:

63–65 parts by weight of finely divided solid silica
16.5–18 parts by weight of finely divided solid alumina
9–11 parts by weight of $K_2O$
4–5 parts by weight $Na_2O$
0.5–0.8 parts by weight $Na_2B_4O_7$ The $K_2O$ and $Na_2O$ may be provided in the form of carbonates while the $Na_2B_4O_7$ may be replaced by boric acid, borax or a potassium or lithium borate. These solids are preferably ground fine enough to pass a 325 mesh screen and the pulverized mixture is then introduced into a liquid medium of which the following is a typical example:

75 parts by weight di-octyl sodium sulfosuccinate
10 parts by weight methanol
5 parts by weight glycerol
10 parts by weight of a 10% solution of a sulfonated bicarboxylic acid ester in water.

In the process of applying the electrically conductive film to predetermined portions of the glass panel, those parts which are to serve as less conductive areas are coated with the masking solution in any suitable manner and the liquid medium is evaporated, either at elevated temperatures or at atmospheric temperature. Thereafter the electroconductive film may be applied in the conventional manner. Then the masking compound is removed, leaving the uncoated surface thereby exposed.

Where it is preferred to apply the electroconductive coating and remove a portion of it in a predetermined pattern to create the less conductive areas, the entire ceramic base is first sprayed with the metal-containing coating solution and the resultant coating is permitted to dry. The dried electroconductive surface is then exposed to the action of an acid and a metal more electronegative than the metal of the coating itself. Where the coating is principally tin oxide, zinc, cadmium, aluminum or iron would be used in the removal process. This may be carried out very effectively by depositing upon the coated base a film of finely divided or pulverulent electronegative metal and dispersing agent, such as zinc, and a water-dispersible binder which serves as a binding medium to hold the zinc on the base. Thereafter the zinc-coated base may be sprayed or otherwise coated with an aqueous solution of an acid such as hydrochloric, sulfuric, nitric, oxalic or other mineral or equivalent acid which does not readily etch glass. Such process is described and claimed in an application of Milton S. Tarnopol, Serial No. 4,929, filed January 28, 1948, for Treatment of Films.

A typical solution for applying the zinc or other electronegative metal to the base may be prepared by making a solution containing:

3500 cubic centimeters water
50 cubic centimeters glycerol
10 grams sodium nitrite
5 grams sodium pyrophosphate
25 grams bentonite and mixing this solution in equal parts by volume with methanol. One pound of powdered zinc is then added to each quart of the resulting methanol solution.

The solution thus obtained is then sprayed upon the glass article to deposit a thin zinc-containing film upon the surface thereof. Thereafter the zinc-coated surface is sprayed with an aqueous solution of an acid such as a dilute aqueous hydrochloric acid having an HCl concentration of 1 to 10 percent by weight of the amount of the acid solution being sufficient to thoroughly wet the zinc-coated surface. Following this operation, the sheet is allowed to stand for a short period of time, about 5 to 10 minutes, and is then washed with water to remove the remaining acid and other coating components. The electroconductivity of the surface which has been exposed to this treatment will then be found to have been destroyed since the electroconductive coating has been removed.

In preparing the panels which are the subject of the invention only a partial removal of the electroconductive coating is effected. The glass sheet to be treated is coated with a suitable resistance material such as an easily removable plastic film or other coating which will resist the attack of the acid and metal at such portions where removal of the coating is not desired. For example, in preparing the various panels illustrated in the drawings, an acid-resisting coating in the form of pre-cut strips of pressure-sensitive regenerated cellulose tape may be applied to the electroconductive surface of the glass panel whereupon the zinc-containing solution is applied followed by the application of the dilute acid. Other methods of preventing the attack of the film removing solutions will occur to those skilled in the art. Likewise other methods of removing areas of the electroconductive film may be used. For example, the film may be cut or removed mechanically by means of a knife.

In Fig. 5 a windshield panel 20 is illustrated. The panel comprises a glass sheet 22, essentially rectangular in form but having rounded corners on the upper edge and a semi-circular indenture or cutout 29 on the lower edge, provided with nonparallel bus bars or conductive edge strips 24, and having thereon an electroconductive transparent film 25. The film 25 is provided with channels 27 and 27a of lower conductivity than the film 25. The channels or barriers tend to prevent current from flowing to certain areas of the bus bars, in this case these areas being the ends of the bus bar and the central semi-circular portion of the lower bus bar. These channels 27a extend outward from the bus bar a substantial distance, usually at least 10 to 20 percent of the distance between the bus bars but terminate in the central area of the film. Following the general principle of the invention as described above, the concentration of less conductive areas may increase as the distance between the bus bars decreases where uniformity of current distribution is desired.

In Fig. 6 a windshield panel 30 is illustrated. The panel 30 comprises a glass sheet 32 essentially quadrilateral in form but having rounded corners on the upper edge, nonparallel bus bars or conductive edge strips 34 thereon and an electroconductive transparent film 35. The film 35 is provided with a number of areas 37 of lower conductivity than the film 35 which may be in the form of small squares, circles, rectangles, or other geometric or irregular designs.

The panel shown in Fig. 7 employs a somewhat different principle to overcome the difficulties mentioned above. In this embodiment the surface resistivity distribution is varied by decreasing the resistance between the bus bars in certain areas. This may be accomplished by increasing the thickness of the film in these areas or by other means hereinafter described. The panel is shaped similarly to that shown in Fig. 6. The electroconductive bus bars 34 are disposed along the two longer edges of the panel as in Fig. 5. However, the entire area between the bus bars is coated with an electroconductive film 36 and no areas of lower conductivity are provided. As in the other panels, the overall resistivity of the coating is high where the distance between the bus bars is low and vice versa so that the resistance between the bus bars is substantially the same throughout their entire length. It has been found that a suitable panel may be prepared by applying a progressively thicker and more electroconductive coating as the distance between the bus bars becomes greater. In Fig. 7 the coating is of minimum thickness in area A, is increasingly thicker in areas B and C and thickest in area D where the distance between the bus bars is maximum.

By varying the thickness of the coating in such a manner, the surface resistivity of the film is greatest in the area between the right hand termini of the bus bars since the coating in the intervening area is least conductive. Naturally, care must be exercised to prevent the formation of any haze or opacity by building up too thick a film in the region where maximum conductivity and minimum resistivity are desired. Various methods may be employed to secure the type of coated panel shown in Fig. 7. For example, by using a single coating solution, I may apply a primary film to the entire panel, apply a second film over the first except in the area A, where the bus bars are closest to each other, and continue the process so that area B has a two fold coating, area C has a three fold coating while area D has a four fold coating.

Another method of providing the embodiment shown in Fig. 7 involves the use of several solutions from which films of different conductivity may be deposited. In such a procedure the solution providing the least electroconductive film would be used in spraying area A while progressively more electroconductive films would be applied in areas B, C and D respectively. The change in conductivity from one area to another, for example from A to B, is not necessarily a rapid change, but is preferably a gradual change to insure uniform heating.

According to a further embodiment of the invention, which is claimed in my copending application Serial No. 189,988, filed October 13, 1950, the surface resistivity distribution may be varied by provision of means to reduce the resistance between the bus bars in desired areas. This may be accomplished by advantageous placement of electroconductive aids or electroconductive areas in the electroconductive film intermediate the main or edge bus bars. Such electroconductive aids or areas, which may be opaque or translucent, should have electroconductivity substantially above (usually at least 2 and preferably at least 5 times) that of the transparent film. They may consist of metal and have the same composition and conductivity as the bus bars and may be applied in the same way. However, they may simply comprise localized areas of transparent film which are appreciably higher as to surface electroconductivity usually having surface electroconductivity several times that of the film. For example, these areas simply may be thicker spots in the film, the increased thickness providing higher electroconductivity. The density of such areas will determine the current distribution of the current flow through the conductive film.

Several variations of this embodiment are shown in Figs. 8 and 9. In Fig. 8, a viewing closure 40 is shown comprising a glass base 42 having main bus bars 44 and an electroconductive transparent film 46 thereon with electroconductive aids or areas 48a, 48b and 48c spaced intermediate the bus bars 44. It will be noted as shown in Fig. 8 that the bus bars are not exactly opposite each other since the ends are spaced in an endwise direction as well as laterally. Consequently current flow tends to concentrate at the bus bar ends denoted as A and B, highest current flow being established at the pointed ends of the bus bars.

Electroconductive aids 48a, 48b and 48c receive flow of current and cause the current to be distributed more evenly over a greater length of bus bar. It will be noted that electroconductive aid 48b is shorter than electroconductive aid 48a and is disposed between electroconductive aid 48a and the bottom bus bar 44. This auxiliary conductive aid prevents excessive concentration of current flow at the end of electroconductive aid 48a. Any desired number of such spaced aids may be disposed along the edge of the conductive panel to compensate for the edgewise spacing of the opposed ends of the bus bars. Moreover, as shown by electroconductive aid 48c, the electroconductive aids may be curved in any convenient pattern to achieve the current distribution sought.

Referring to Fig. 9, an irregularly shaped panel 50 comprising a glass base 52 having thereon bus bars 54 and an electroconductive film 56 is shown. In this panel the longest current path is between the right hand termini of the bus bars around the bulge in area C. A smaller amount of current flows through this section than flows between the bus bars at the other sections of the bar. Consequently this section will be cooler than the rest of the panel. On the panel are shown three types of electroconductive aids, 58, 59 and 60 illustrating three geometrical shapes having the contour shown which may be utilized separately, or in combination as shown, to decrease the resistance in section C and to cause more current to flow therethrough. An electroconductive aid 61 in the form of a strip of electroconductive metal spaced from and running completely across the panel parallel to the top bus bar is employed to distribute current evenly to the top bus bar thereby preventing the formation of an excessively heated area immediately adjacent the right hand terminus of the top bus bar.

In the various embodiments described above, it will be understood that substantially any desired distribution of current flow through the transparent electroconductive film may be obtained by controlling the shape of the current path or the overall resistance of the film paths between the bus bars. In general the low conductivity channels or other means for influencing current distribution are disposed so as to equalize flow of current over the panel to achieve reasonably uniform heating and to avoid hot spots. However, exactly equal current flow is not necessary to achieve essentially uniform heating since some variation is permissible, the usual object being to obtain a panel in which the temperature established during current flow within any area having a width equal to 10 percent of the length of a bus bar is within 50° F. of the temperature established in another area of the panel.

It should be understood that the invention herein described is not limited to use for establishment of uniform current distribution although useful for this purpose. Other current distributions may be established and highly unbalanced current distribution may be accomplished within the ambit of this invention if such is desired. For example, in the embodiment of Fig. 7 the area A may have the lowest and area D the highest surface resistivity in order to achieve a specially desired heating effect. Moreover the channels of low conductivity or electroconductive aids described herein may be so shaped and disposed as to direct maximum current flow to a central localized area in a panel if desired.

Combinations of the embodiments shown in and described in conjunction with Figs. 1 to 9 may be made whereby, for example, the heating panel may comprise both the coated areas having varying electroconductivity as well as channels or other areas of lower conductivity to distribute current flow, or electroconductive aids or areas of higher conductivity may be used in conjunction with nonconductive or low conductive channels for the purpose.

The invention is particularly applicable to use in connection with transparent tin oxide film. However, the invention is also applicable in connection with other transparent electroconductive films, particularly metal oxide films. Thus the films herein contemplated may comprise cadmium oxide, antimony oxide, cobalt oxide, zinc oxide, indium oxide, titanium oxide, chromium oxide, platinum oxide, silicon oxide, silver oxide, thallium oxide, etc. which may be prepared using bromide, chloride or acetate of the corresponding metal. Transparent metal films normally have poor light transmission but are suitable where this property is not seriously objectionable.

Where viewing closures for vehicles are to be provided, the base for the film normally is ordinary window or lime soda glass. Other refractory materials including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

I claim:

1. An electrically conductive article which comprises a refractory base, a pair of spaced bus bars on the base, an electroconductive film on the base, between and in electrical contact with the bus bars, and transparent barriers of conductivity lower than the film interposed between the bus bars where current flow is high, whereby to lengthen the path of current flow and substantially reduce excessive variation in the current flow.

2. An electrically conductive article which comprises a refractory base, a pair of spaced bus bars on the base, an electroconductive film on the base, between and in electrical contact with the bus bars, the resistance distribution of the film being such that linear variation of current flow to a bus bar tends to occur whereby the current flow to one portion of a bus bar tends to be higher than the current flow to another portion of such bus bar upon application of an electric potential between the bus bars, and transparent barriers of conductivity lower than the film interposed between the bus bars where the current flow is high, whereby to lengthen the path of current flow and to substantially reduce excessive variation in the current flow.

3. An article of manufacture which comprises a refractory base having thereon a pair of laterally spaced electroconductive bus bars disposed in a nonparallel manner and a transparent electroconductive film which is less electroconductive than the bus bars, said film being in electrical contact with the bus bars and having surface resistivity which increases as the distance between the bus bars decreases, whereby the film resistance between opposed sections of the bus bars is substantially the same throughout their entire length.

4. An article of manufacture which comprises a transparent glass base having thereon a pair of laterally spaced electroconductive bus bars disposed in a nonparallel manner and an electroconductive transparent metal oxide coating which is less electroconductive than the bus bars, said coating being in electrical contact with the bus bars and having a surface resistivity which increases as the distance between the bus bars decreases, whereby the film resistance between the opposed sections of the bus bars is substantially the same throughout their entire length.

5. An article of manufacture which comprises a refractory base, a pair of spaced non-parallel bus bars thereon, an electroconductive film, which is less conductive than the bus bars, on the base between the bus bars and in electrical contact therewith, and areas in the film between closer portions of the bus bars, said areas being of less electroconductivity than the film.

6. An article of manufacture which comprises a refractory base, a pair of spaced non-parallel bus bars thereon, an electroconductive metal oxide film, which is less conductive than the bus bars, on the base between the bus bars and in electrical contact therewith, and areas in the film between closer portions of the bus bars, said areas being of less electroconductivity than the film.

7. An article of manufacture which comprises a refractory base, a pair of spaced non-parallel bus bars thereon, an electroconductive tin oxide film, which is less conductive than the bus bars, on the base between the bus bars and in electrical contact therewith, and areas in the film between closer portions of the bus bars, said areas being of less electroconductivity than the film.

8. An article of manufacture which comprises a refractory base, a pair of spaced bus bars thereon, an electroconductive film, between and in electrical contact with the bus bars, which is less conductive than the bus bars, and channels in the film of less electroconductivity than the film extending from one bus bar toward the other bus bar.

9. An electrically conductive article which comprises a refractory base, a pair of laterally spaced non-parallel bus bars on the base, an electroconductive film on the base, between and in electrical contact with the bus bars, which is less conductive than the bus bars, and channels in the film of less electroconductivity than the film and adjacent portion of bus bars which are closest whereby said channels are capable of intercepting at least a portion of the current which tends to flow to said adjacent portion.

10. An article of manufacture which comprises a transparent refractory base having thereon a pair of laterally spaced non-parallel electroconductive bus bars, a transparent electroconductive film which is less electroconductive than the bus bars, and channels in the film of less electroconductivity than the film, said channels dividing the film into substantially parallel strips, the distance between adjacent channels being smaller as the distance between opposed sections of the bus bars decreases, and being intersected but not connected by relatively short channels at spaced intervals, the number of said short channels increasing as the distance between the bus bars decreases, whereby excessive variation in current flow between the bus bars is substantially minimized.

11. An article of manufacture which comprises a transparent refractory base having thereon a pair of laterally spaced non-parallel electroconductive bus bars, a transparent electroconductive film which is less electroconductive than the bus bars, and channels in the film of less electroconductivity than the film, some of said channels extending across substantially the entire distance between the bus bars and dividing the film into substantially parallel strips, and others of the said channels extending across only a portion of the distance between the bus bars, the length of extension of the channels decreasing as the distance between the bus bars increases and the distance between the channels increasing as the distance between the bus bars increases.

12. An article of manufacture which comprises a refractory base having thereon a pair of laterally spaced electroconductive bus bars, a transparent electroconductive film which is less conductive than the bus bars, and a narrow elongated channel disposed in the film and extending in a direction transversely of the bus bars, said channel being of lower conductivity than the film.

13. An article of manufacture which comprises a refractory base having thereon a pair of laterally spaced electroconductive bus bars disposed in a non-parallel manner, extending across the surface of the base from edge to edge and having a pair of opposed termini adjacent one edge of the base which are closer together than other opposed portions of the bus bars, a transparent electroconductive film which is less electroconductive than the bus bars, the edge of said film intermediate the termini of the bus bars being separated from the corresponding edge of the base by a barrier of less electroconductivity than the electroconductive film.

CYRIL S. LINDER.

REFERENCES CITED

The following references are of record in the file of this patent:

UNITED STATES PATENTS

| Number | Name | Date |
| --- | --- | --- |
| 1,266,941 | Heller | May 21, 1918 |
| 1,318,028 | Thomson | Oct. 7, 1919 |
| 2,061,107 | Schellenger | Nov. 17, 1936 |
| 2,205,543 | Rideau et al. | June 25, 1940 |
| 2,406,367 | Griffith et al. | Aug. 27, 1946 |
| 2,475,379 | Stong | July 5, 1949 |